United States Patent
Yellin et al.

(10) Patent No.: US 8,131,843 B2
(45) Date of Patent: Mar. 6, 2012

(54) ADAPTIVE COMPUTING USING PROBABILISTIC MEASUREMENTS

(75) Inventors: Daniel M. Yellin, Raanana (IL); Jorge Buenabad-Chavez, Tacuba (MX)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/415,818

(22) Filed: Mar. 31, 2009

(65) Prior Publication Data

US 2010/0250642 A1    Sep. 30, 2010

(51) Int. Cl.
G06F 15/177    (2006.01)

(52) U.S. Cl. ........................ 709/224; 709/226

(58) Field of Classification Search ............ 709/224, 709/226
See application file for complete search history.

(56) References Cited

U.S. PATENT DOCUMENTS

| | | | |
|---|---|---|---|
| 5,539,883 A | 7/1996 | Allon et al. | |
| 6,466,980 B1 * | 10/2002 | Lumelsky et al. | 709/226 |
| 7,065,549 B2 | 6/2006 | Sun et al. | |
| 7,065,764 B1 * | 6/2006 | Prael et al. | 718/102 |
| 7,693,993 B2 * | 4/2010 | Sheets et al. | 709/226 |
| 2003/0208284 A1 * | 11/2003 | Stewart et al. | 700/30 |
| 2006/0282474 A1 | 12/2006 | MacKinnon | |
| 2008/0184254 A1 * | 7/2008 | Bernard et al. | 718/105 |

OTHER PUBLICATIONS

Harchol-Balter, "Process Lifetimes are Not Exponential, more like 1/T: Implications on Dynamic Load Balancing", Aug. 1994, Rept. # UCB/CSD-94-826, U of C, Berkeley, 25 pp.
Katramatos, et al., "A Cost/Benefit Model for Dynamic Resource Sharing", 2000, Univ. of VA, IEEE, 10 pp.
Paton, et al., "Autonomic Query Parallelization using Non-dedicated Computers: An Evaluation of Adaptivity Options", 2008, VLDB Journal, Univ. of Manchester, UK, 22 pp.
Saranyan, "Prediction Based Load Balancing Heuristic for a Heterogeneous Cluster", Sep. 2003, Indian Inst. of Science, Bangalore, 84 pp.
Yellin, et al., "Probabilistic Adaptive Load Balancing for Parallel Queries", 2008, ICDE Workshop, 24 slide prints.
Zaki, et al., "Customized Dynamic Load Balancing for a Network of Workstations", 1996 Univ of Rochester (NY), 10 pp.

* cited by examiner

*Primary Examiner* — John Follansbee
*Assistant Examiner* — Glenford Madamba
(74) *Attorney, Agent, or Firm* — Kali Law Group, P.C.

(57) ABSTRACT

Determining a configuration of a computer system for performing an operation, by determining an expected performance of a computer system based on at least one possible usage scenario given a current configuration of the computer system according to a current set of system parameters, determining an expected performance of the computer system based on at least one possible usage scenario given at least one candidate configuration of the computer system according to at least one candidate set of system parameters, and configuring the computer system according to whichever of the sets of system parameters that has a more favorable expected performance as determined in accordance with predefined criteria.

17 Claims, 11 Drawing Sheets

TABLE 1  UTILIZATION SCENARIOS

| PROCESSORS | 102 | 104 | 106 |
|---|---|---|---|
| Scenario 1 | 10 | 40 | 50 |
| Scenario 2 | 30 | 55 | 15 |

TABLE 2  MEASURED UTILIZATIONS

| PROCESSORS | 102 | 104 | 106 |
|---|---|---|---|
| MEASURED 1 | 25 | 35 | 40 |
| MEASURED 2 | 20 | 45 | 35 |
| MEASURED 3 | 10 | 75 | 15 |
| MEASURED 4 | 5 | 45 | 50 |

TABLE 3  MEASURED DIFFERENCES

| | | DELTA | | | TOTAL DELTA | COUNT |
|---|---|---|---|---|---|---|
| | PROCESSORS | 102 | 104 | 106 | | |
| MEASURED 1 | SCENARIO 1 | 15 | 5 | 10 | 30 | 1 |
| | SCENARIO 2 | 5 | 20 | 25 | 50 | 0 |
| MEASURED 2 | SCENARIO 1 | 10 | 5 | 15 | 30 | 2 |
| | SCENARIO 2 | 10 | 10 | 20 | 40 | 0 |
| MEASURED 3 | SCENARIO 1 | 0 | 35 | 35 | 70 | 2 |
| | SCENARIO 2 | 20 | 20 | 0 | 40 | 1 |
| MEASURED 4 | SCENARIO 1 | 5 | 5 | 0 | 10 | 3 |
| | SCENARIO 2 | 25 | 10 | 35 | 70 | 1 |

TABLE 4  PROBABILITY OF OCCURRENCE

| UTILIZATION SCENARIO 1 | 0.75 |
|---|---|
| UTILIZATION SCENARIO 2 | 0.25 |

FIG. 3B

TABLE 5   DISTRIBUTION POLICIES
(% OF TASK ASSIGNED TO EACH PROCESSOR)

| PROCESSORS | 102 | 104 | 106 |
|---|---|---|---|
| CURRENT DISTRIBUTION POLICY | 0 | 40 | 60 |
| CANDIDATE DISTRIBUTION POLICY | 20 | 40 | 40 |

TABLE 6   COSTS FOR DISTRIBUTION POLICIES

| | | COST PER PROCESSOR | | | NET COST |
|---|---|---|---|---|---|
| | PROCESSORS | 102 | 104 | 106 | |
| CURRENT POLICY | UTILIZATION SCENARIO 1 | 0 | 9 | 7 | 9 |
| | UTILIZATION SCENARIO 2 | 0 | 10 | 5 | 10 |
| CANDIDATE POLICY | UTILIZATION SCENARIO 1 | 4 | 5 | 5 | 5 |
| | UTILIZATION SCENARIO 2 | 3 | 2 | 10 | 10 |

TABLE 7   EXPECTED COSTS

| | EXPECTED COST | SWITCH COST | TOTAL EXPECTED COST |
|---|---|---|---|
| CURRENT POLICY | 9.25 | 0 | 9.25 |
| CANDIDATE POLICY | 6.25 | 2 | 8.25 |

ADAPTIVE COMPUTING USING PROBABILISTIC MEASUREMENTS

FIELD OF THE INVENTION

The present invention relates to adaptive computing in general, and more particularly to dynamic load balancing between processors in a distributed computing environment.

BACKGROUND OF THE INVENTION

Complex computer processing tasks rely on computing systems to closely monitor themselves and adapt to changing conditions to optimize their performance. This is often called "Autonomic Computing." A fundamental problem for such systems is to determine when to adapt and what to adapt to. Although many heuristics have been given, a generic technique is lacking.

In particular, many complex computer processing tasks that have high computing resource requirements, such as querying massive databases having millions of records, may be broken into several smaller tasks that can be processed in parallel in a distributed manner by multiple computer processors. However, load imbalances among parallel processors, particularly where the processors are not dedicated to the same distributed tasks, may result in overall processing inefficiencies. One solution is to send subsequent tasks to the processors with the most available processing power. This approach works well when the tasks are relatively simple and can be completed quickly. However, when the tasks are complex, this approach does not alleviate an already over-utilized processor that may be holding up computations further down the pipeline. Another approach is to migrate currently-processing tasks from over-utilized processors to processors with available processing power. As in the case above, this may work well if the task is relatively small and has a small amount of data associated with it. However, if the task is complex or has a large amount of data associated with it, migrating the task may result in less overall processing efficiency than if the task is not migrated. An efficient adaptive computing strategy would therefore be advantageous.

SUMMARY OF THE INVENTION

The invention in embodiments thereof discloses novel systems and methods for adaptive computing using probabilistic measurements.

In one aspect of the present invention a method is provided for determining a configuration of a computer system for performing an operation, the method including a) determining an expected performance of a computer system based on at least one possible usage scenario given a current configuration of the computer system according to a current set of system parameters, b) determining an expected performance of the computer system based on at least one possible usage scenario given at least one candidate configuration of the computer system according to at least one candidate set of system parameters, and c) configuring the computer system according to whichever of the sets of system parameters that has a more favorable expected performance as determined in accordance with predefined criteria.

In another aspect of the present invention the determining step b) includes determining the expected performance given the candidate configuration where a cost of reconfiguring the computer system from its current configuration to the candidate configuration is included in the determining of the expected performance.

In another aspect of the present invention a distributed processing system is provided supporting process migration, the system including a distributed computer processing environment having a plurality of computer processors that are configured to collectively perform a distributed processing task, a utilization monitor configured to determine a utilization of each task running on each of the processors, a scenario forecaster configured to calculate one or more possible utilization scenarios for the processors, a distribution determiner configured to determine at least one candidate distribution policy for redistributing the distributed task among the processors, and a cost calculator configured to calculate an expected cost of allowing the distributed task to remain distributed among the processors according to a current distribution policy according to which the distributed task is currently distributed among the processors, calculate an expected cost of redistributing the distributed task among the processors according to any of the candidate distribution policies, where any of the calculations are based on any of the utilization scenarios and associated probabilities of the scenarios occurring, and compare the expected costs of the current and candidate distributions to determine which of the distributions are optimal in accordance with predefined optimization criteria, where any of the utilization monitor, scenario forecaster, distribution determiner, and cost calculator are implemented in either of computer hardware and computer software and embodied in a computer-readable medium.

In another aspect of the present invention any of the utilization scenarios describes its associated processor's future available computational resources available for performing the task.

In another aspect of the present invention any of the utilization scenarios for the processors is calculated based on a history of the utilization of each of the processors.

In another aspect of the present invention the scenario forecaster is configured to calculate an associated probability for any of the utilization scenarios indicating the likelihood that the scenario will occur in the future.

In another aspect of the present invention the costs represent any of the amount of time to finish processing the task, resources consumed by the task, or network traffic generated within the computer processing environment in connection with the processing of the task.

In another aspect of the present invention the expected cost of any of the candidate distribution policies includes a switching cost which includes costs associated with migrating the task from any of the processors to any other of the processors according to the candidate distribution policy.

In another aspect of the present invention the switching cost includes costs associated with any of a) migrating any processes, data, and state information, and b) network delays and processor slow-down attributable to the migration.

In another aspect of the present invention the scenario forecaster is configured to calculate the probability associated with each of the utilization scenarios by determining a degree of closeness between each of the utilizations in the history and each of the utilization scenarios according to predefined closeness criteria, using the degree of closeness to determine which of the utilization scenarios is most closely matched to each of the utilizations in the history, incrementing a counter associated with the most closely matched scenario, and dividing each of the counters by the number of the utilizations in the history.

In another aspect of the present invention a method is provided for process migration of a distributed processing task, the method including determining a utilization of each task running on each of a plurality of computer processors in a distributed computer processing environment, where the processors are configured to collectively perform a distributed processing task, calculating one or more possible utilization scenarios for the processors, determining at least one candidate distribution policy for redistributing the distributed task among the processors, calculating an expected cost of allowing the distributed task to remain distributed among the processors according to a current distribution policy according to which the distributed task is currently distributed among the processors, calculating an expected cost of redistributing the distributed task among the processors according to any of the candidate distribution policies, and comparing the expected costs of the current and candidate distributions to determine which of the distributions are optimal in accordance with predefined optimization criteria, where any of the expected cost calculations are based on any of the utilization scenarios and associated probabilities of the scenarios occurring, and where any of the utilization monitor, scenario forecaster, distribution determiner, and cost calculator are implemented in either of computer hardware and computer software and embodied in a computer-readable medium.

In another aspect of the present invention the step of calculating a utilization scenario includes describing any of the processor's future available computational resources available for performing the task.

In another aspect of the present invention the step of calculating a utilization scenario includes calculating based on a history of the utilization of each of the processors.

In another aspect of the present invention the step of determining at least one candidate distribution policy includes calculating an associated probability for any of the utilization scenarios indicating the likelihood that the scenario will occur in the future.

In another aspect of the present invention the steps of calculating the expected costs includes calculating the expected costs as representing any of the amount of time to finish processing the task, resources consumed by the task, or network traffic generated within the computer processing environment in connection with the processing of the task.

In another aspect of the present invention the step of calculating the expected cost of redistributing includes including a switching cost which includes costs associated with migrating the task from any of the processors to any other of the processors according to the candidate distribution policy.

In another aspect of the present invention the switching cost includes costs associated with any of a) migrating any processes, data, and state information, and b) network delays and processor slow-down attributable to the migration.

In another aspect of the present invention the scenario forecaster is configured to calculate the probability associated with each of the utilization scenarios by determining a degree of closeness between each of the utilizations in the history and each of the utilization scenarios according to predefined closeness criteria, using the degree of closeness to determine which of the utilization scenarios is most closely matched to each of the utilizations in the history, incrementing a counter associated with the most closely matched scenario, and dividing each of the counters by the number of the utilizations in the history.

In another aspect of the present invention a computer program product is provided for process migration of a distributed processing task, the computer program product including a computer readable medium, and computer program instructions operative to determine a utilization of each task running on each of a plurality of computer processors in a distributed computer processing environment, where the processors are configured to collectively perform a distributed processing task, calculate one or more possible utilization scenarios for the processors, determine at least one candidate distribution policy for redistributing the distributed task among the processors, calculate an expected cost of allowing the distributed task to remain distributed among the processors according to a current distribution policy according to which the distributed task is currently distributed among the processors, calculate an expected cost of redistributing the distributed task among the processors according to any of the candidate distribution policies, and compare the expected costs of the current and candidate distributions to determine which of the distributions are optimal in accordance with predefined optimization criteria, where any of the expected cost calculations are based on any of the utilization scenarios and associated probabilities of the scenarios occurring, and where the program instructions are stored on the computer readable medium.

BRIEF DESCRIPTION OF THE DRAWINGS

The invention will be understood and appreciated more fully from the following detailed description taken in conjunction with the appended drawings in which:

FIG. 3B shows exemplary results of an implementation of the method of FIG. 3A;

FIG. 5B shows exemplary results of an implementation of the method of FIG. 5A;

DETAILED DESCRIPTION OF THE INVENTION

Figure 1:
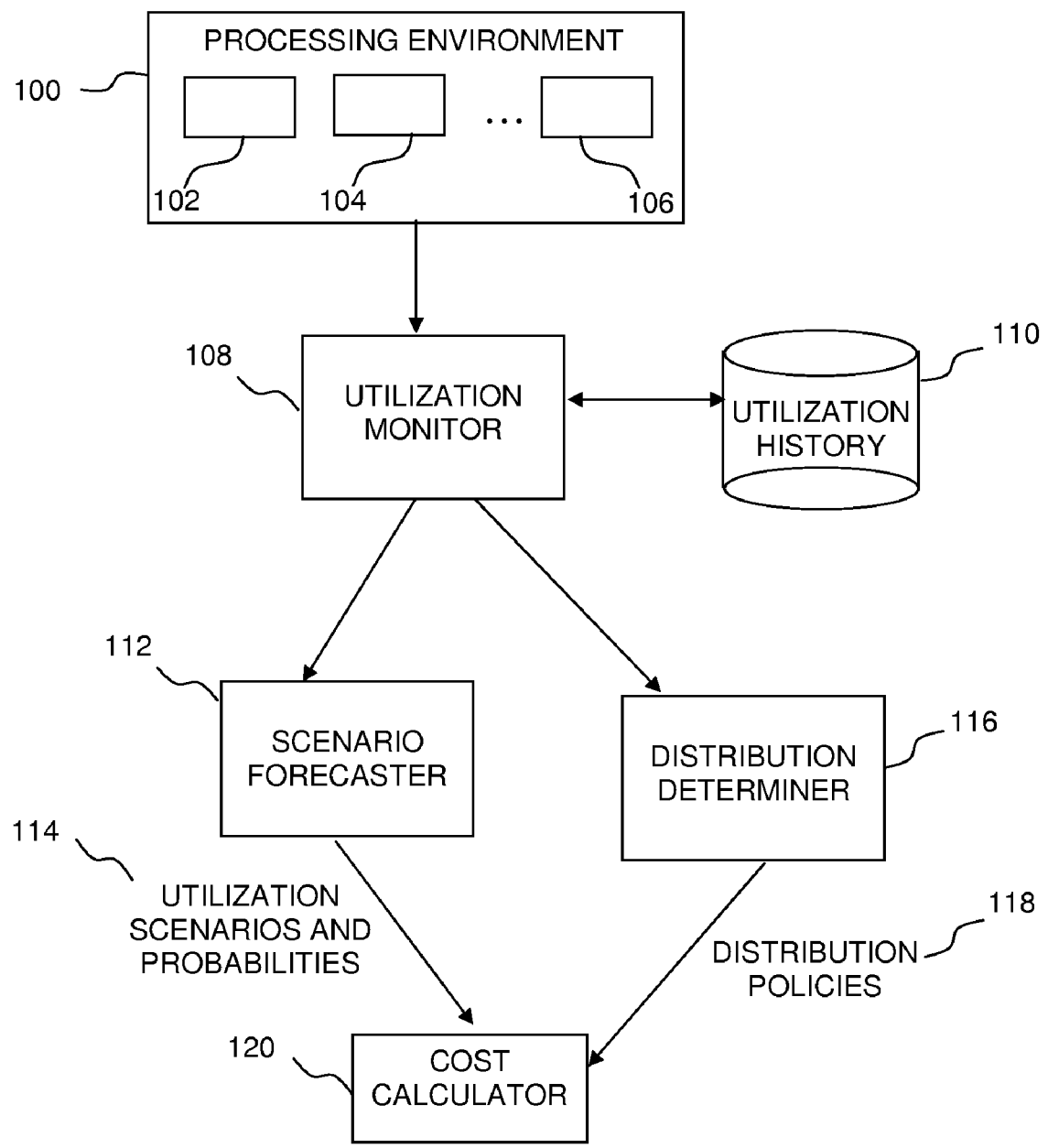
FIG. 1 is a simplified conceptual illustration of a distributed processing system supporting process migration, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention described herein provides for adaptivity in computer systems that involves a change of system configuration to meet performance criteria, where the change may involve operations such as executing different code within a procedure, invoking a different algorithm using different data structures and procedures, linking/unlinking different software components on demand, or invoking a different hardware configuration, to name but a few examples. In general, adaptivity entails changing the current operating mode of the system to a different operating mode. Since such a change may involve costs, the invention provides decision making criteria for comparing the costs and benefits to be derived from the different operating modes, and for deciding whether or not to switch modes.

The invention, in one embodiment, will be understood in the context of a specific parallel computing scenario employing load balancing, where load balancing here refers to changing the distribution of work, or workload, to be processed by each processor in a group of processors collectively executing the operations of an application, such as a matrix multiplication, or a database parallel query, to name a few. In this scenario, the workload may initially be allocated among the processors according to the capacity of the processors. However, as the application is being executed, the workload of a processor may become too great, resulting in a load imbalance. In such a case, the processor may delay the overall execution of the parallel application. Adapting the processors to a new workload allocation may improve performance once the adaptation is completed, but making the adaptation may also incur a performance cost. Thus, the trade-off of continuing with the current workload allocation vs. adapting the application to a new workload allocation is evaluated based on cost considerations. However, it will be appreciated that the system and method described below may be adapted for use in any application where dynamic adaptation is advantageous, particularly in applications containing tasks that are computationally expensive, and where the cost of adaptation is non-trivial.

Reference is now made to FIG. 1, which is a simplified conceptual illustration of a distributed processing system supporting process migration, constructed and operative in accordance with an embodiment of the invention. In the system of FIG. 1, a distributed computer processing environment 100 is shown having a plurality of computer processors, such as processors 102, 104, and 106, that are configured to collectively operate on a distributed processing task in accordance with conventional distributed processing techniques. In FIG. 1, processors 102, 104, and 106 preferably have the same total computing capability, although the system of FIG. 1 may be used in a computer processing environment where the processors have different total computing capabilities. A processing task may be distributed among the processors in environment 100, such as according to a distribution policy which has been formulated using conventional techniques, and describes how the task is to be divided into multiple sub-tasks that are then distributed to a selected set of processors in environment 100. For example, if the task is to be distributed on the three processors 102, 104, and 106, the distribution policy may indicate to distribute 30% of the work to the processor 102, 25% to processor 104, and 45% to processor 106. Initially, the workload may be allocated among the processors according to the capacity of the processors. Furthermore, the processors in environment 100 may be available to process tasks which are unrelated to the distributed task mentioned above, such as if the processors are part of a grid-computing or cloud-computing infrastructure, where multiple tasks originating from potentially diverse sources are distributed to shared computing resources.

A utilization monitor 108 is provided for determining the utilization of each of the processors in environment 100, such as at random or predefined time intervals, where the utilization is expressed as the amount of computational resources currently used or available for use at a processor. Processor utilization may be measured using conventional techniques, such as by determining contention at a processor as a function of the tasks performed by the processor. Utilization monitor 108 preferably maintains the utilization information obtained above in a utilization history 110 which is preferably maintained over a predefined time interval, such as by using a sliding time window of a predefined length of time. The utilization may be measured using any suitable technique, such as a percentage of a processor's available processing power which may be normalized to sum to one. For example, if the processor utilizations for processors 102, 104, and 106 are 50%, 70%, and 30% respectively, then these values may be normalized to 0.3333, 0.4667, and 0.2 respectively. If processors 102, 104, and 106 do not have the same total computing capabilities, appropriate adjustments to the above calculations may be made. A lower utilization of a processor may indicate that there is less of the processor's resources available for the distributed task. A processor may be over-utilized for the task if it has been allocated more work for the task than it can handle effectively, as may be based on predefined effectiveness criteria, while a processor may be under-utilized for the task if it could perform more work than it is currently scheduled to process. By transferring work from over-utilized to under-utilized processors, the time taken to finish the distributed task may be shortened, and system throughput is increased.

A scenario forecaster 112 preferably uses some or all of the utilization information stored in history 110 to calculate one or more possible utilization scenarios 114 for the processors in environment 100, where the utilization scenario describes each processor's future available computational resources for the task, and may be normalized similarly to the utilization measurements above. Examples of utilization scenarios include the average utilization over a predefined time-frame, or an interpolated utilization based on an observed trend, to name a few. Forecaster 112 preferably calculates an associated probability for each utilization scenario indicating the likelihood that the scenario will occur in the future.

A distribution determiner 116 preferably determines, using any suitable technique, one or more candidate distribution policies 118 for reallocating the distributed task among the processors in environment 100, such as by determining a distribution policy that operates optimally under a possible or current utilization scenario, where some or all of the sub-tasks mentioned above may be reallocated from over-utilized processors to under-utilized processors.

A cost calculator 120 calculates an expected cost of allowing the distributed task to remain distributed among its current set of processors in environment 100, as well as an expected cost for each of the candidate distribution policies 118 given the utilization scenarios 114 and their corresponding probabilities, where the cost of a distribution policy may represent any parameter, such as the amount of time to finish processing the task, the resources consumed by the task, or the network traffic generated by the task, to name a few. For illustration purposes only, the discussion below will refer to the cost in terms of processing time. In addition, for each candidate distribution policy, cost calculator 120 calculates a switching cost which includes costs associated with migrating the various processes, data, and state information from their current processors to other processors according to the candidate distribution policies, as well as various other costs, such as network delays introduced into the system and processor slow-down due to the migration just mentioned, to name a few. Calculator 120 compares the expected cost of the current distribution with the expected costs of candidate distribution policies 118 and determines an optimal distribution policy in accordance with predefined optimization criteria, such as by choosing the distribution policy with the smallest expected cost. If the optimal distribution policy requires a distribution that differs from the current distribution, distribution determiner 116 may implement the optimal distribution policy using conventional techniques, or may send a notification to an independent distributed task manager with information regarding the optimal distribution policy. Otherwise, the processors in distributed computer processing environment 100 may continue performing the distributed task according to the current distribution.

Figure 2A:
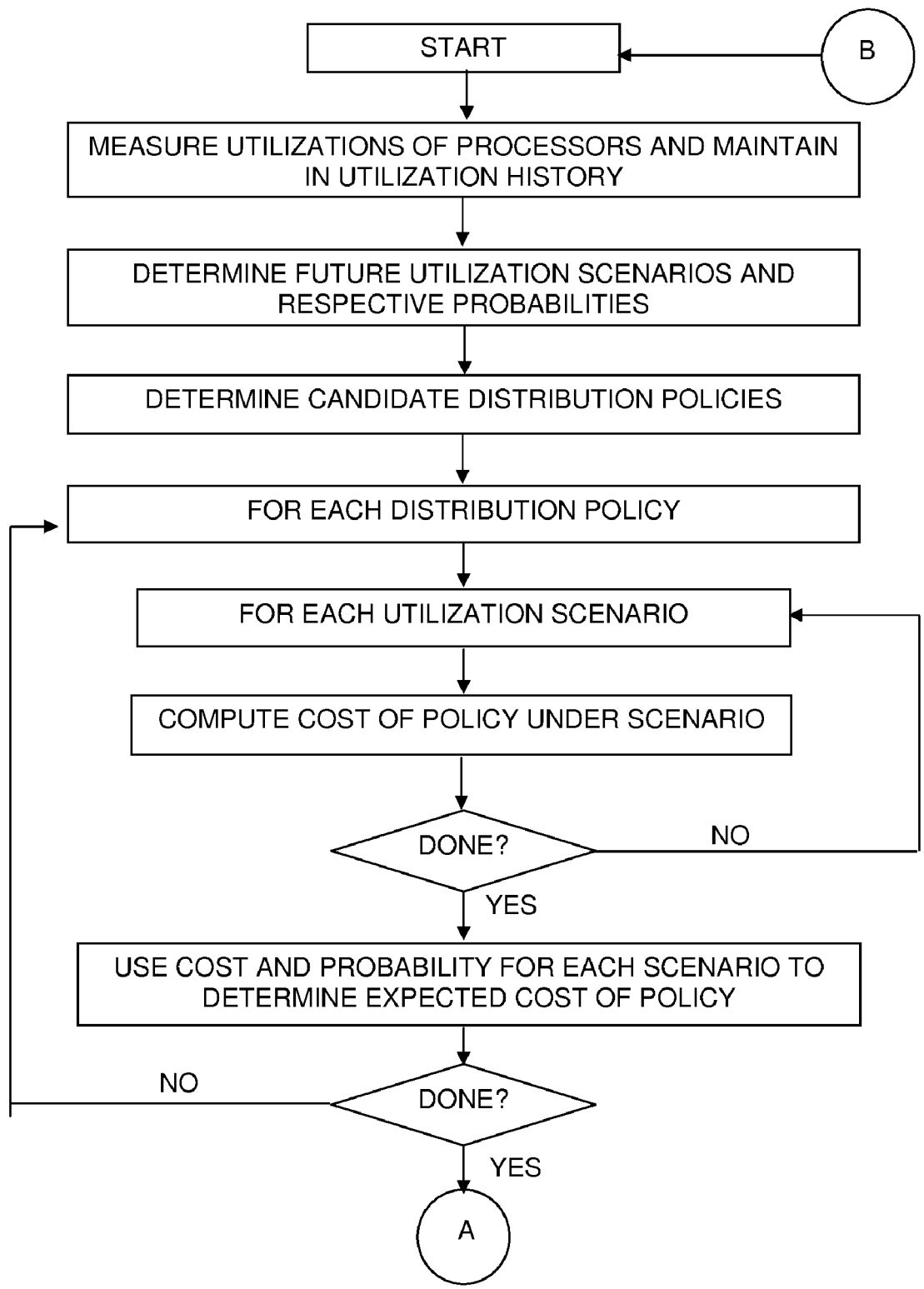
FIGS. 2A-2B, taken together, is a simplified conceptual flowchart illustration of a method of operation of the system of FIG. 1 operative in accordance with an embodiment of the invention.
Figure 2B:
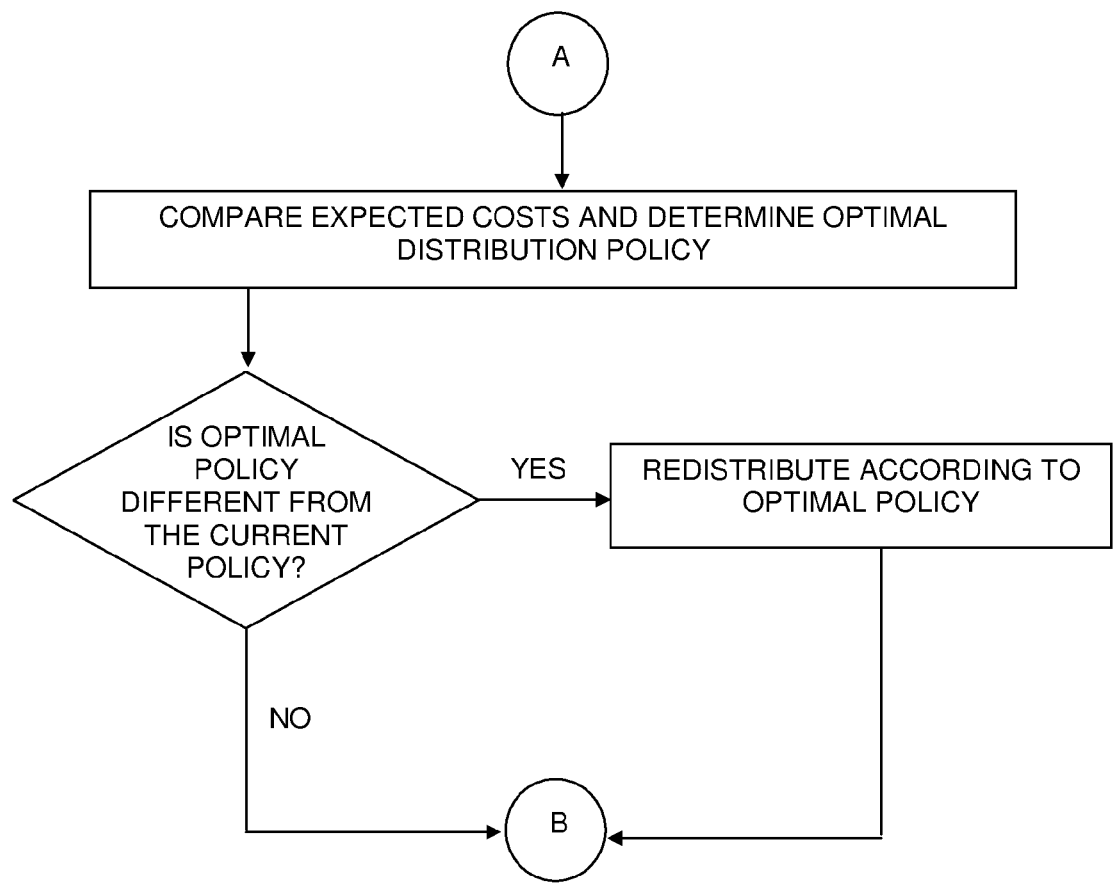

Reference is now made to FIGS. 2A-2B which, taken together, is a simplified flowchart illustration of an exemplary method of operation of the system of FIG. 1, operative in accordance with an embodiment of the invention. The method described below with reference to FIGS. 2A-2B may be repeated at regular, or predefined, intervals, and thus a decision whether to keep the current distribution of the task or to re-distribute the task according to a new candidate distribution policy is made at regular or predefined intervals.

In method of FIGS. 2A-2B, the utilization of the processors is measured, and a history of the utilizations measured is maintained. The utilization measurements are used to calculate one or more possible utilization scenarios, as well as a probability of each scenario occurring. A method for calculating the probabilities of the proposed utilization scenarios is described hereinbelow with reference to FIGS. 3A-3B. One or more candidate distribution policies are determined, and the cost is computed for the current distribution policy and each candidate distribution policy under each utilization scenario calculated above. A method for calculating the cost of a distribution policy given a specific utilization scenario may be computed directly or may be approximated by the procedure described hereinbelow with reference to FIG. 4. The expected overall cost for the current distribution policy and each candidate distribution policy is determined using the costs calculated above, as well as the probabilities of the utilization scenarios calculated above. A method for calculating expected costs of distribution policies is described hereinbelow with reference to FIGS. 5A and 5B. The expected costs are compared and the optimal distribution policy is determined in accordance with predefined optimization criteria, such as by choosing the distribution policy with the smallest expected cost. If the optimal distribution policy requires that the processing task be distributed differently from the current distribution policy, the distributed task is redistributed among the processors as necessary in accordance with the optimal distribution policy.

It may be appreciated that the utilization scenarios calculated above may be constructed based upon any criteria. For instance, the current distribution policy may be used as the basis of a utilization scenario, under the assumption that the current distribution policy accurately models the current utilization of the processors. Alternatively, the utilization history can be used to construct a utilization scenario, under the assumption that future processor utilization will be similar to previous utilization, where the most recent utilizations or an average of recent utilizations may be good choices for utilization scenarios. Other utilization scenarios are possible, such as those that interpolate from the recent utilization history to a future utilization, or those that find historical utilization patterns to infer what a likely future utilization scenario will be. Various machine learning techniques may be employed to predict future utilization scenarios. Alternatively, domain knowledge can be used to infer likely utilization scenarios, such as knowledge about when external loads or tasks will be introduced into the system, such as during off-business-hours or end-of-day or end-of-month processing.

It may also be appreciated the candidate distribution policies discussed above may be determined in various ways. For example, candidate distribution policies may be formulated to optimize task distribution according to the future utilization scenarios calculated above, such as by using an average of recent utilizations. Alternatively, candidate distributions may be chosen independently of the utilization scenarios.

Figure 3A:
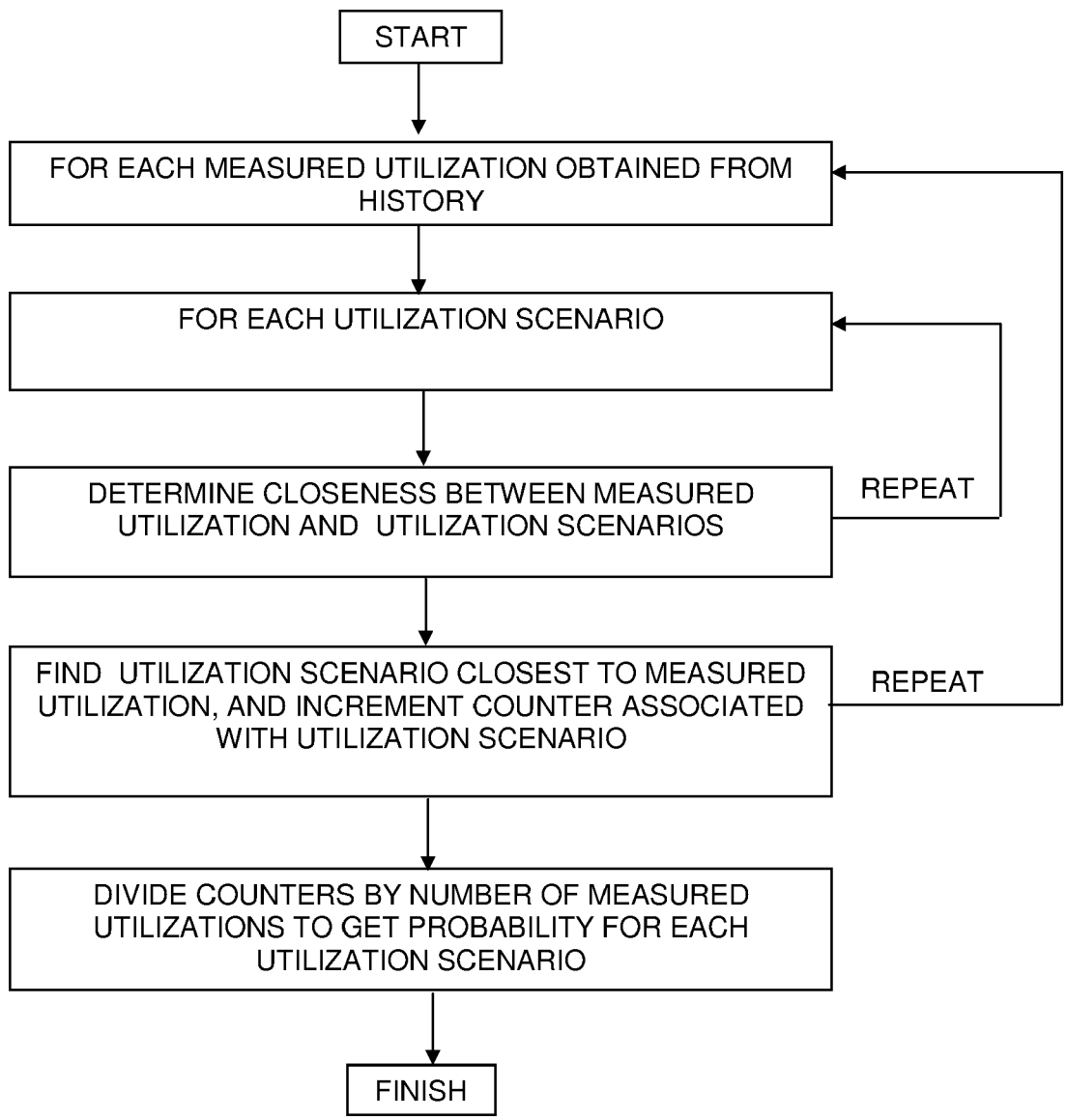
FIG. 3A is a simplified flowchart illustration of an exemplary method for determining the probabilities of different utilizations scenarios, operative in accordance with an embodiment of the invention.

Reference is now made to FIG. 3A, which is a simplified flowchart illustration of an exemplary method for determining the probabilities of different utilizations scenarios, such as are referred to in FIGS. 2A-2B, operative in accordance with an embodiment of the invention. In the method of FIG. 3A, for each measured utilization that has been obtained and maintained in history, a degree of closeness is determined between the measured utilization and each of the possible utilization scenarios calculated above, such as by computing a numerical difference between them. The possible utilization scenario with the closest match to the measured utilization is found, such as by finding the possible utilization with the smallest numerical difference calculated above. A counter associated with that possible utilization is then incremented. Upon finding the closest matched possible utilization for each measured utilization, and incrementing the associated counters, the probability of occurrence for the possible utilizations is calculated by dividing the value of the counters by the total number of measured utilizations in the history.

The method described in FIG. 3A is for illustration purposes only, and may be readily adapted in various ways to calculate the probabilities of utilization scenarios, such as by:

using a predefined range of recent utilization measurements instead of using the entire utilization history;

giving different weights to each utilization measurement, such as giving greater weight to more recent measurements;

using linear or non-linear analysis of utilization measurements to predict the probability of future utilization scenarios;

using a wide variety of machine learning techniques, including pattern analysis, to determine the probability of future utilization scenarios.

Reference is now made to FIG. 3B in which exemplary results of an implementation of the method of FIG. 3A are shown. Table 1 in FIG. 3B shows two possible utilization scenarios:

utilization scenario 1, where processor 102 has 10% processing power available for processing this task, processor 104 has 40% available, and processor 106 has 50% available, and utilization scenario 2, where processor 102 has 30% available, processor 104 has 55% available, and processor 106 has 15% available.

Using the same measure of percent of processing power available, Table 2 in FIG. 3B shows four measured utilization scenarios. Table 3 shows the closeness of the utilization scenarios shown in Table 1 to the four measured utilization scenarios, shown in Table 2 by computing difference vectors. The difference vectors are determined by computing the numerical difference between each utilization scenario in Table 1 and each measured utilization scenario in Table 2, and are tabulated in Table 3 under the heading 'DELTA'. For example, the differences between utilization scenario 1 and measured utilization 1 are 15%, 5%, and 10% for processors 102, 104, and 106, respectively. Similarly, the differences between utilization scenario 2 and measured utilization 1 are 5%, 20%, and 25% for processors 102, 104, and 106, respectively. The remaining difference vectors are computed in a similar manner. The measure of closeness is calculated as the total difference, shown in Table 3 under the heading 'TOTAL DELTA', and is found by summing the differences in the vectors above. For example, the difference between utilization scenario 1 and measured utilization 1 is 15%+5%+10% for a total of 30%. Similarly, the difference between utilization scenario 2 and measured utilization 1 is calculated as 5%+20%+25% for a total of 50%. Since the difference between utilization scenario 1 and measured utilization 1 is smaller than the difference for utilization scenario 2, utilization scenario 1 is determined to be closer to measured utilization 1, and a counter associated with utilization scenario 1, shown under the heading 'COUNT', is incremented. Similarly, both utilization scenarios are compared with each remaining measured utilization vector, and the associated counter is incremented for the closest matched utilization scenario, resulting in a final count of three best matches out of four comparisons for utilization scenario 1, and one best match out of four comparisons for utilization scenario 2.

Referring to Table 4 in FIG. 3B, the probability for each utilization scenario is calculated by dividing the final values of the counters in Table 3 by the total number of measured utilization vectors, in this case four, resulting in a probability for utilization scenario 1 of 0.75, and a probability for utilization scenario 2 of 0.25.

The method described above in FIG. 3A and illustrated in FIG. 3B represents just one of various ways to measure the closeness of the utilization vectors in order to derive the resulting probabilities of the utilization scenarios, and it will be appreciated that other well-known vector norms for determining the deviation between the utilization scenarios and the historical utilizations may be used. For example, the deviation may be defined as the largest DELTA, or MAX(DELTA) over the processors for each utilization scenario. The utilization scenario with the smallest deviation, or smallest MAX (DELTA), may be determined to be closest to the historic utilization, and its associated counter would be incremented.

Figure 4:
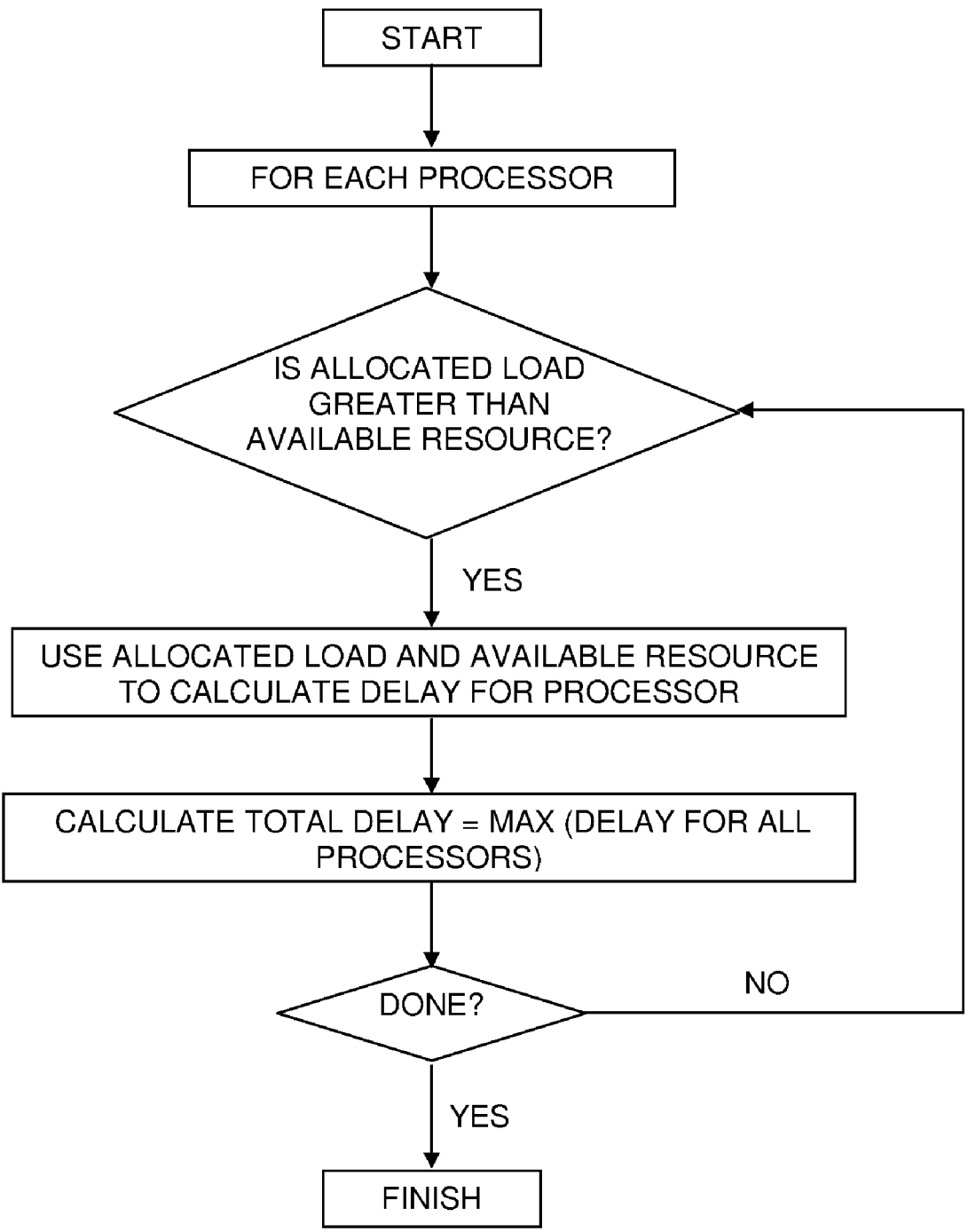
FIG. 4 is a simplified flowchart illustration of an exemplary method for calculating the cost for an application to complete a task under a given distribution policy and utilization scenario, constructed and operative in accordance with an embodiment of the invention.

Under certain circumstances, such as when the total allocated workload and total available processing power are known, the processing cost for a processor may be directly determined using conventional methods. However, if the processing cost cannot be directly determined, the processing cost for a processor under a given distribution policy and utilization scenario may be determined using various other methods. Reference is now made to FIG. 4, which is a simplified flowchart illustration of an exemplary method for calculating the cost of a distribution policy under a given utilization scenario. In the method of FIG. 4, for each processor, the load allocated to that processor is compared with the resources expected to be available at that processor, where both the allocated load and available resource may be measured using conventional methods, such as measuring the allocated load as a percentage of the task allocated to the processor, and measuring the available resource as a percentage of the processor's total computing resource available to the task. If the processors have different total computing capabilities, then this calculation may be adjusted accordingly. If the allocated load is greater than the expected available resource, then the processor will be overloaded for this task, resulting in a delay for that processor to complete processing its allocated load. The delay may be calculated using any suitable method, such as by calculating an inefficiency factor equal to the difference between the allocated load and available resource divided by the available resource. As the processors are preferably configured to operate in parallel, the total delay may be calculated as the maximum delay for all the processors to process their respective allocated loads. Thus, for a period of processing time, P, the additional processing time required due to using a non-optimal distribution policy may be computed as the total delay calculated above multiplied by P. P may represent any appropriate time period such as the expected time to complete the task, or the amount of time that has passed since the last change in the distribution policy, and may be calculated using any suitable method. By choosing an appropriate P, the total amount of time required to complete the task under the above distribution policy and utilization scenario, Total_Time, may be calculated as the sum of P and the additional processing time calculated above, or:

$$Total\_Time = P + P * total\ delay$$

Figure 5A:
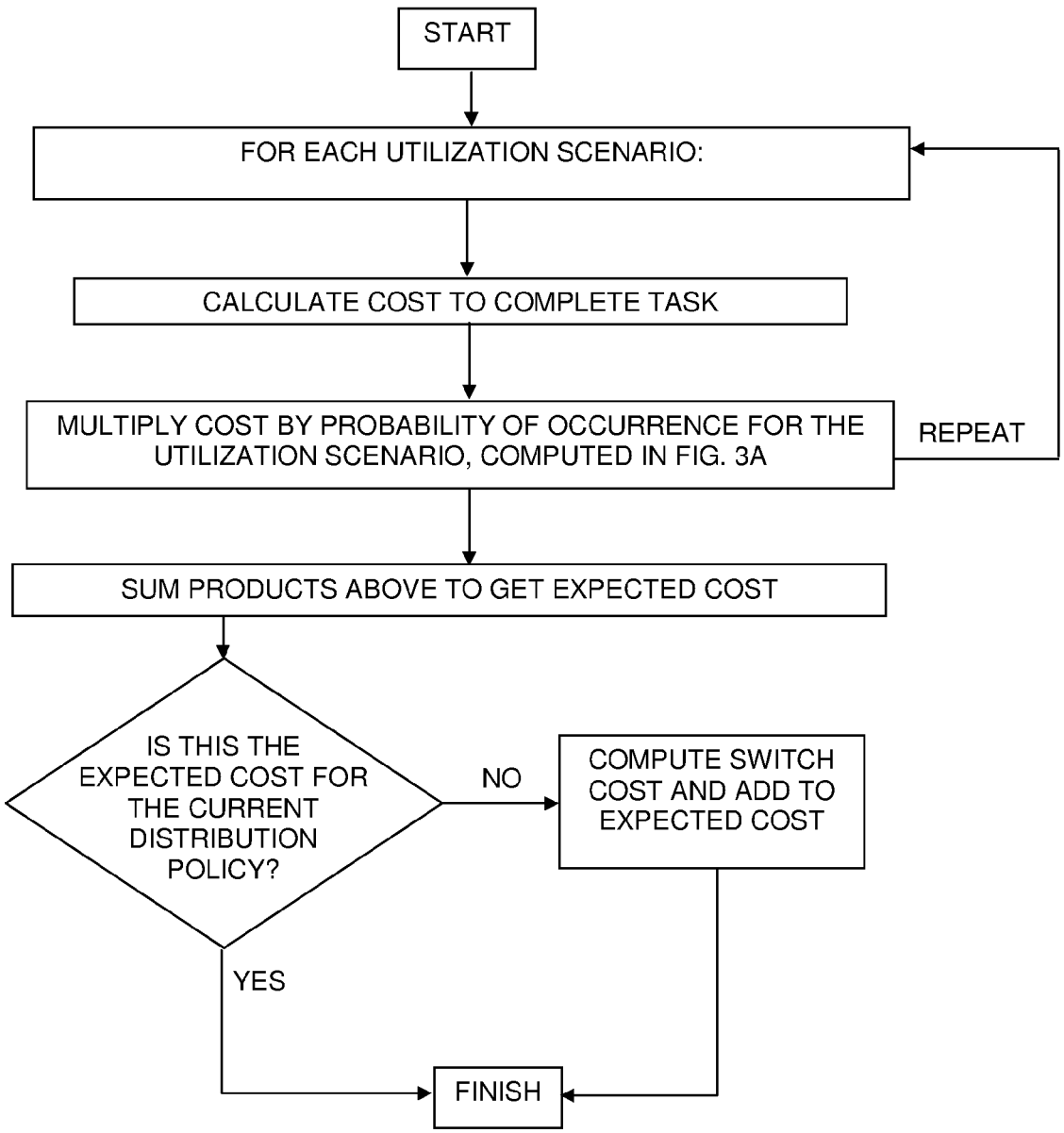
FIG. 5A is a simplified flowchart illustration of an exemplary method for calculating the expected costs of current and candidate distribution policies, operative in accordance with an embodiment of the invention.

Reference is now made to FIG. 5A, which is a simplified flowchart illustration of an exemplary method for calculating the expected costs of current and candidate distribution policies, such as is referred to in FIG. 2A, operative in accordance with an embodiment of the invention. In the method of FIG. 5A an expected cost, EC, is calculated in accordance with conventional expected value calculation techniques, where a sum is taken of the products of the values for one or more events and corresponding probabilities associated with the events as follows:

$$EC = \text{value for event 1} * prob(\text{event 1}) + \text{value for event 2} * prob(\text{event 2}) + \ldots$$

Thus, for a given distribution policy, the cost for completing the distributed processing task under a possible utilization scenario is calculated using conventional methods, and is multiplied by the probability of occurrence for that utilization scenario. This is repeated for each possible utilization scenario under consideration. The computed products are summed to arrive at the expected cost for a given distribution policy. In addition, if the given distribution policy is not the current distribution policy being implemented, a switching cost incurred by adapting to a different distribution policy such as the cost of migrating some or all of the sub-tasks and their associated data and state information in accordance with the given distribution policy is added to the expected cost, where the switching cost may be computed using conventional methods. For example, using the formula above, the expected cost for the current distribution policy, EC(DP_current) may be calculated as:

$$EC(DP\_current) = Cost(DP\_current, util\_scenario\ 1) * prob(util\_scenario\ 1) + Cost(DP\_current, util\_scenario\ 2) * prob(util\_scenario\ 2) + \quad (1)$$

and the expected cost for a candidate distribution policy that is different from the current distribution policy may be calculated as:

$$EC(DP\_candidate) = \\ Cost(DP\_candidate, util\_scenario\ 1) * prob(util\_scenario\ 1) + \\ Cost(DP\_candidate, util\_scenario\ 2) * prob(util\_scenario\ 2) + \\ \ldots + switch\_cost \quad (2)$$

where the computation of prob(util_scenario i) has been described above and in FIGS. 3A and 3B, and Cost(DP, util_scenario i) may be determined using any suitable method such as an analytical method as described above and in FIG. 4, or by simulating the time for the system to complete the task given a particular distribution policy, under a given utilization scenario.

Reference is now made to FIG. 5B in which exemplary results of an implementation of the method of FIG. 5A are shown of the expected costs for two distribution policies, where cost is taken to be the number of microseconds (μs) to complete a task. Table 5 in FIG. 5B shows the two distribution policies to be considered, the current distribution policy, and a candidate distribution policy, described as a percentage of the processing task allocated to each processor. Table 6 in FIG. 5B, shows the costs under each distribution policy. The columns under the title 'Cost per Processor' show the cost for each of the three processors to complete their allocated sub-task under each utilization scenario, where the cost may be computed using conventional methods. For example, the costs for processors 102, 104, and 106 to complete their tasks under the current distribution policy and utilization scenario 1 are 0 μs, 9 μs, and 7 μs respectively. As the processors are configured to operate in parallel, the net cost, shown under the heading 'NET COST' in Table 6, is calculated as the maximum cost for all the processors to complete their respective sub-tasks, which in this case would be $$Net\ Cost = MAX(0, 9, 7) = 9\ \mu s$$

Similarly, the net cost is computed under utilization scenario 2, as well as the net costs for the candidate distribution policy. Table 7 shows the expected costs, which are calculated according to the formulas described above using the net costs, and the probability of occurrence for each utilization scenario shown in Table 4 in FIG. 3B. Thus the expected cost for the current distribution policy, or EC_current, is computed according to (1):

$$EC\_current = 9*0.75 + 10*0.25 = 9.25\ \mu s$$

Similarly, the expected cost for the candidate distribution policy, or EC_candidate, is computed according to (2):

$$EC\_candidate = 5*0.75 + 10*0.25 + 2 = 8.25\ \mu s$$

Thus, in this example, the candidate distribution policy has a lower expected cost than the current distribution policy, even when taking into account the switching cost of the migration.

Although the invention is described hereinabove within the context of a parallel computing application, the invention may be used in many other applications, particularly applications containing tasks that are computationally intensive, such as:

Protecting access to shared data by requiring a thread to acquire a relevant lock to gain access, and blocking access if the relevant lock is held by another thread. As blocking is costly, the alternative is to spin indefinitely, or to spin for a predetermined time frame before blocking, the tradeoff being whether and for how long to spin before blocking.

Using components, such as web services, to develop distributed applications. Adaptive components have multiple implementations, each optimized for sequences of service requests with particular properties. The tradeoff is whether and when to change a component implementation on account of the request sequence being observed.

The translation look-aside buffer (TLB) within the processor caches the most recently used page table entries to speed up address translation. TLBs now support address translation for superpages, pages larger than the base-size pages in powers of two, in order to reduce TLB miss overhead. Its use for applications is optional, however, because virtual superpages must be mapped onto physical superpages of same size and alignment, which means committing more main memory. The tradeoff is whether and when to incur the cost of promoting physical superpages (from base-size pages) for the purpose of reducing TLB miss overhead.

Figure 6A:
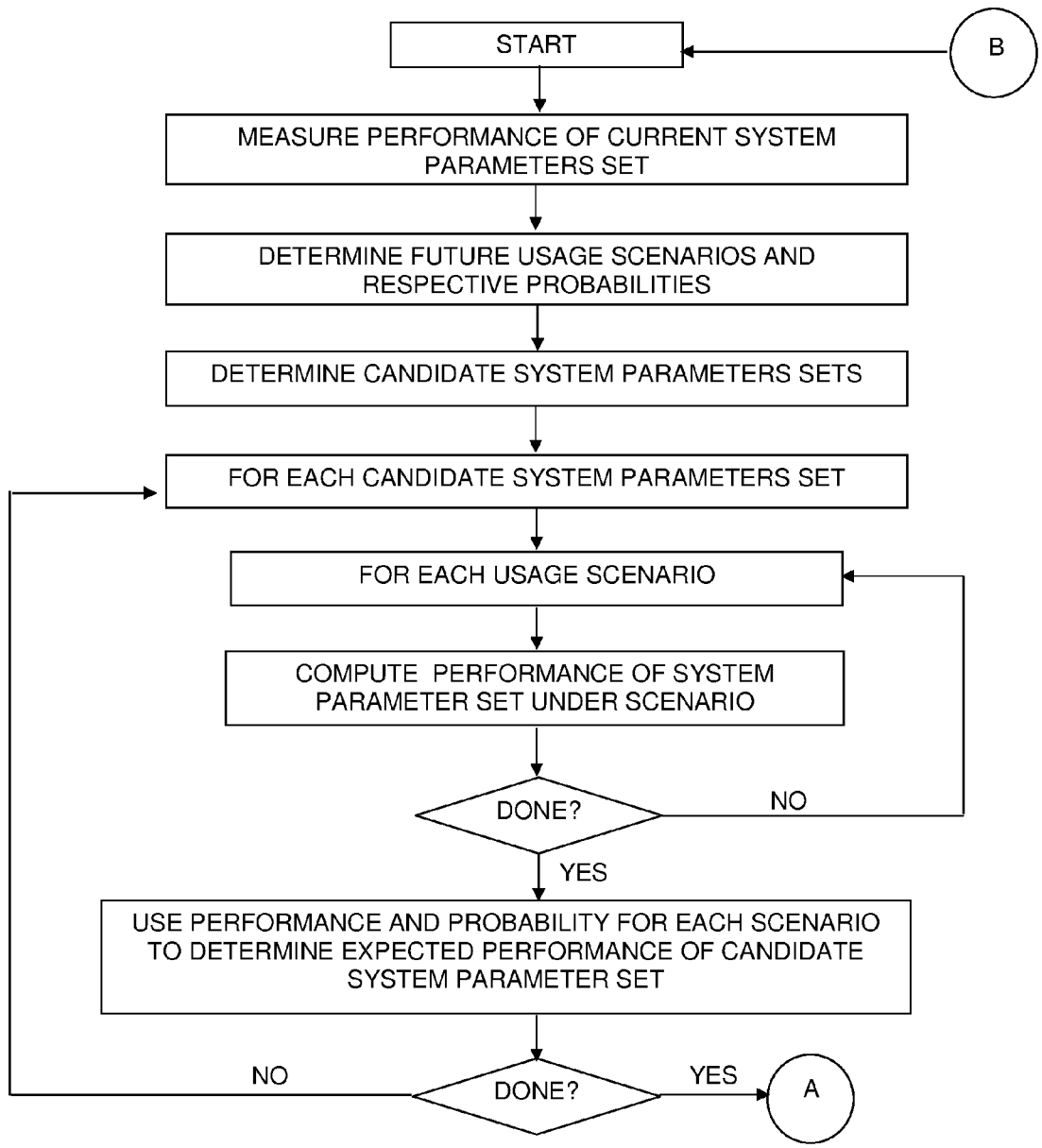
FIGS. 6A-6B, taken together, is a simplified conceptual flowchart illustration of a method for adaptive computing, constructed and operative in accordance with an embodiment of the invention.
Figure 6B:
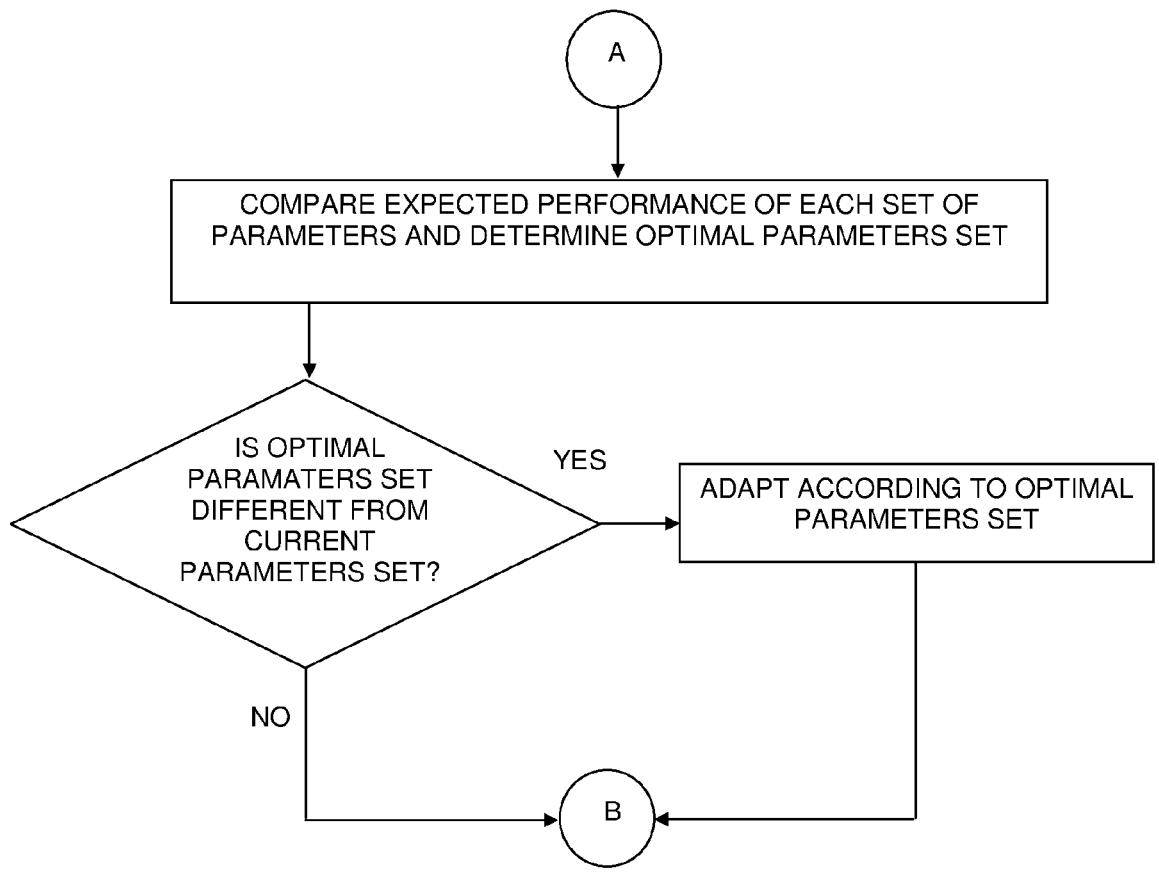

Reference is now made to FIGS. 6A-6B which, taken together, is a simplified flowchart illustration of a method for adaptive computing, constructed and operative in accordance with an embodiment of the invention. It may be appreciated that the method of FIGS. 6A-6B is applicable to any autonomic computing problem where system performance is to be optimized according to a predefined set of system parameters. The method described below with reference to FIGS. 6A-6B may be repeated at regular, or predefined, intervals, and thus a decision whether to keep the system configured according to the current parameter set or to reconfigure the system according to a new parameter set is made at regular or predefined intervals. In the method of FIGS. 6A-6B, the expected performance of a system that is configured according to a predefined set of system parameters is measured, where "performance" may be any known measure of performance. A set of predefined system usage scenarios is determined using any known means, as well as the probability of their occurrence, where "usage" may be any usage of system resources. One or more sets of candidate system parameters are determined, and the expected performance of the system is computed for each set of candidate system parameters for which the system is configured under each usage scenario. The expected performance of the system as configured for each set of system parameters is calculated using the performance computations above in conjunction with the probabilities of the usage scenarios. If the candidate system parameters are different than the current system parameters, then any performance degradation due to reconfiguring the system according to the candidate system parameters is preferably taken into consideration when calculating the performance. For example, reconfiguring a system according to a changed parameter value may require provisioning new computers which may consume system resources and impact performance. The expected performances of the system as configured for the current and candidate system parameters are compared, and the set of system parameters that provides optimal system performance is determined. If the optimal set of system parameters is different than the current set of system parameters, then the system is reconfigured according the optimal set of system parameters.

It will be appreciated that by using the system and methods of the invention for dynamically adapting a system configuration based on expected performance given probabilistic usage scenarios, the decision whether or not to adapt to a different configuration may be evaluated using a cost vs. benefit analysis, thereby improving overall performance of the system.

Figure 7:
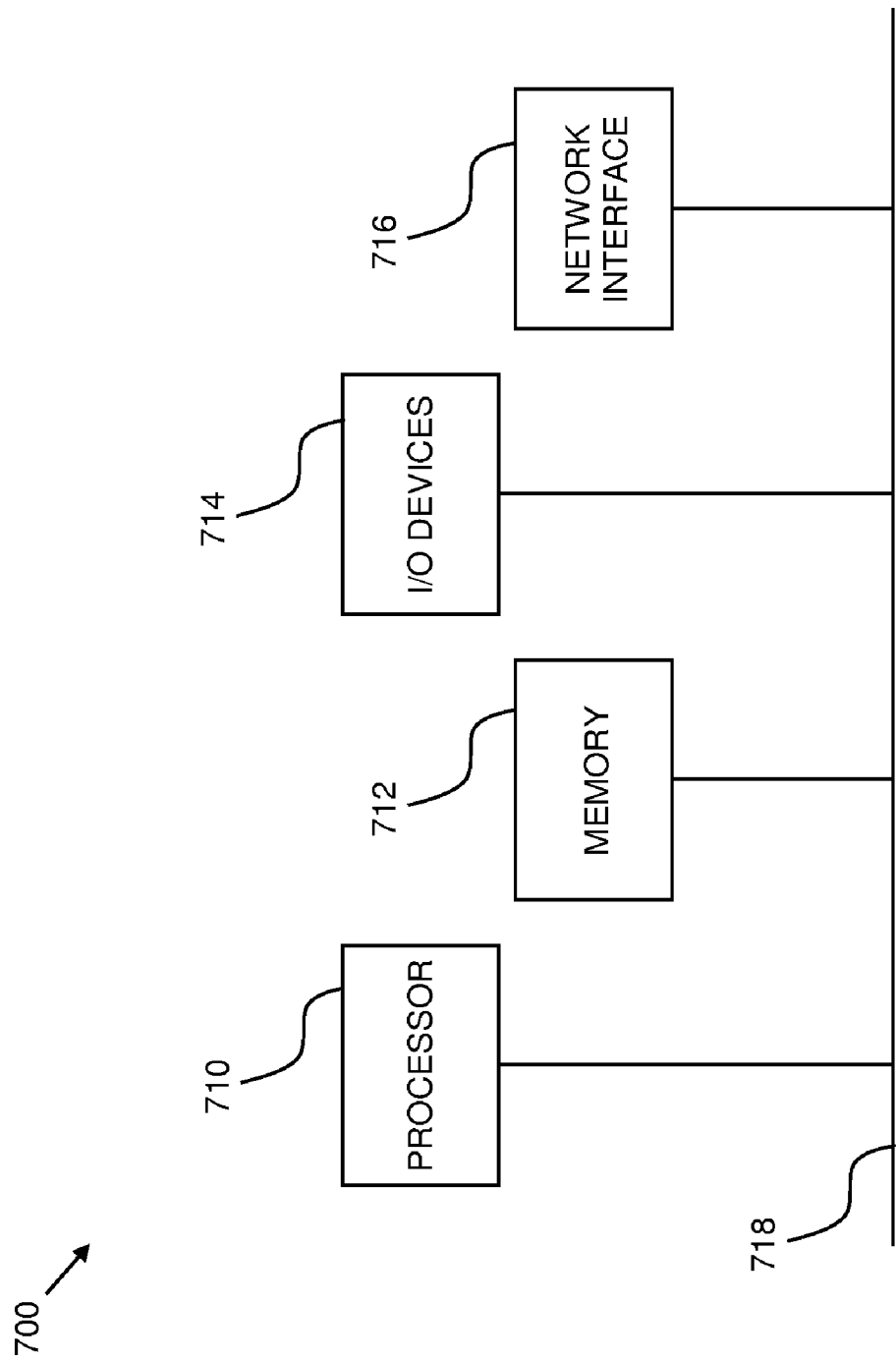
FIG. 7 is a simplified block diagram of an exemplary hardware implementation of a computing system in accordance with an embodiment of the invention

Referring now to FIG. 7, block diagram 700 illustrates an exemplary hardware implementation of a computing system in accordance with which one or more components/methodologies of the invention (e.g., components/methodologies described in the context of FIGS. 1A-6B) may be implemented, according to an embodiment of the invention.

As shown, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A distributed processing system supporting process migration, the system comprising:
    a distributed computer processing environment having a plurality of computer processors that are configured to collectively perform a distributed processing task under a current distribution policy, wherein the current distribution policy describes how the distributed processing task is to be divided into a plurality of sub-tasks that are then distributed to the plurality of computer processors:
    a utilization monitor configured to determine a utilization of each task running on each of said processors, wherein the utilization is expressed as an amount of computational resources currently used or available for use at a processor:
    a scenario forecaster configured to calculate one or more possible utilization scenarios for said processors;
    a distribution determiner configured to determine at least one candidate distribution policy for redistributing said distributed processing task among said processors; and
    a cost calculator configured to
    calculate an expected cost of allowing said distributed processing task to remain distributed among said processors according to the current distribution policy according to which said distributed processing task is currently distributed among said processors,
    calculate an expected cost of redistributing said distributed processing task among said processors according to any of said candidate distribution policies,
    wherein any of said calculations are based on any of said possible utilization scenarios and associated probabilities of said possible utilization scenarios occurring and on a net cost calculated from the maximum cost of all processors to complete their sub-tasks, and
    compare said expected costs of said current and candidate distributions to determine which of said distributions are optimal in accordance with predefined optimization criteria,
    wherein any of said utilization monitor, scenario forecaster, distribution determiner, and cost calculator are implemented in either of computer hardware and computer software and embodied in a computer-readable medium,
    wherein the expected cost of allowing is calculated using the formula $ECA=\Sigma((Cost(CDP\_Ui))*prob(Ui))$ for i=1 to n, wherein (ECA) is the expected cost of allowing, Cost(CDP_Ui) is a cost of the current distribution policy using the possible utilization scenario, and Prob(Ui) is the probability of occurrence of the possible utilization scenario under the current distribution policy and wherein
    the expected cost of redistributing is calculated using the formula $ECR=((Cost(CnDP\_Ui))*prob(Uci))$ for i=1 to n, wherein (ECA) is the expected cost of allowing, Cost(CnDP_Uci) is a cost of the candidate distribution policy using the possible utilization scenario, and Prob(Uci) is the probability of occurrence of the possible utilization scenario under the candidate distribution policy.

2. The system according to claim 1 wherein any of said possible utilization scenarios describes its associated processor's future available computational resources available for performing said task.

3. The system according to claim 1 wherein any of said possible utilization scenarios for said processors is calculated based on a history of measured utilization scenarios of each of said processors.

4. The system according to claim 3 wherein said scenario forecaster is configured to calculate an associated probability for any of said possible utilization scenarios indicating the likelihood that said possible utilization scenario will occur in the future.

5. The system according to claim 1 wherein said net costs represent any of the amount of time to finish processing said task, resources consumed by said task, or network traffic generated within said computer processing environment in connection with the processing of said task.

6. The system according to claim 1 wherein said expected cost of any of said candidate distribution policies includes a switching cost which includes costs associated with migrating said task from any of said processors to any other of said processors according to said candidate distribution policy.

7. The system according to claim 1 wherein said switching cost includes costs associated with any of a) migrating any processes, data, and state information, and b) network delays and processor slow-down attributable to said migration.

8. The system according to claim 4 wherein said scenario forecaster is configured to calculate said probability associated with each of said utilization scenarios by
    determining a degree of closeness between each of said measured utilization scenarios in said history and each of said possible utilization scenarios according to predefined closeness criteria,
    using said degree of closeness to determine which of said possible utilization scenarios is most closely matched to each of said measured utilization scenarios in said history,
    incrementing a counter associated with said most closely matched scenario, and
    dividing each of said counters by the number of said measured utilization scenarios in said history.

9. A method for process migration of a distributed processing task, the method comprising:
    determining a utilization of each task running on each of a plurality of computer processors in a distributed computer processing environment, wherein said processors are configured to collectively perform a distributed processing task under a current distribution policy, wherein the current distribution policy describes how the distributed processing task is to be divided into a plurality of sub-tasks that are then distributed to the plurality of computer processors;
    calculating one or more possible utilization scenarios for said processors; determining at least one candidate distribution policy for redistributing said distributed processing task among said processors, calculating an expected cost of allowing said distributed processing task to remain distributed among said processors according to a current distribution policy according to which said distributed processing task is currently distributed among said processors;

calculating an expected cost of redistributing said distributed processing task among said processors according to any of said candidate distribution policies; and comparing said expected costs of said current and candidate distributions to determine which of said distributions are optimal in accordance with predefined optimization criteria, wherein any of said expected cost calculations are based on any of said possible utilization scenarios and associated probabilities of said possible utilization scenarios occurring, and wherein any of said utilization monitor, scenario forecaster, distribution determiner, and cost calculator are implemented in either of computer hardware and computer software and embodied in a computer-readable medium, wherein the expected cost of allowing is calculated using the formula $ECA = \Sigma((Cost(CDP\_Ui))*prob(Ui))$ for i=1 to n, wherein (ECA) is the expected cost of allowing, Cost(CDP_Ui) is a cost of the current distribution policy using the possible utilization scenario, and Prob(Ui) is the probability of occurrence of the possible utilization scenario under the current distribution policy and wherein the expected cost of redistributing is calculated using the formula $ECR = \Sigma((Cost(CnDP\_Ui))*prob(Uci))$ for i=1 to n, wherein (ECA) is the expected cost of allowing, Cost(CnDP_Uci) is a cost of the candidate distribution policy using the possible utilization scenario, and Prob(Uci) is the probability of occurrence of the possible utilization scenario under the candidate distribution policy, and SC is the switching cost.

10. A method according to claim 9 wherein said step of calculating a possible utilization scenario comprises describing any of said processor's future available computational resources available for performing said task.

11. A method according to claim 9 wherein said step of calculating a possible utilization scenario comprises calculating based on a history of measured utilization scenarios of each of said processors.

12. A method according to claim 9 wherein said step of determining at least one candidate distribution policy comprises calculating an associated probability for any of said possible utilization scenarios indicating the likelihood that said scenario will occur in the future.

13. A method according to claim 9 wherein said steps of calculating said net costs comprises calculating said expected costs as representing any of the amount of time to finish processing said task, resources consumed by said task, or network traffic generated within said computer processing environment in connection with the processing of said task.

14. A method according to claim 9 wherein said step of calculating said expected cost of redistributing comprises including a switching cost which includes costs associated with migrating said task from any of said processors to any other of said processors according to said candidate distribution policy.

15. A method according to claim 9 wherein said switching cost includes costs associated with any of a) migrating any processes, data, and state information, and b) network delays and processor slow-down attributable to said migration.

16. A method according to claim 12 wherein said scenario forecaster is configured to calculate said probability associated with each of said possible utilization scenarios by determining a degree of closeness between each of said measured utilization scenarios in said history and each of said possible utilization scenarios according to predefined closeness criteria, using said degree of closeness to determine which of said possible utilization scenarios is most closely matched to each of said measured utilization scenarios in said history, incrementing a counter associated with said most closely matched scenario, and dividing each of said counters by the number of said measured utilization scenarios in said history.

17. A computer program product for process migration of a distributed processing task, the computer program product comprising:

a non-transitory computer readable medium; and computer program instructions operative to determine a utilization of each task running on each of a plurality of computer processors in a distributed computer processing environment, wherein said processors are configured to collectively perform a distributed processing task under a current distribution policy, wherein the current distribution policy describes how the distributed processing task is to be divided into a plurality of sub-tasks that are then distributed to the plurality of computer processors, calculate one or more possible utilization scenarios for said processors, determine at least one candidate distribution policy for redistributing said distributed processing task among said processors, calculate an expected cost of allowing said distributed processing task to remain distributed among said processors according to a current distribution policy according to which said distributed processing task is currently distributed among said processors, calculate an expected cost of redistributing said distributed processing task among said processors according to any of said candidate distribution policies, and compare said expected costs of said current and candidate distributions to determine which of said distributions are optimal in accordance with predefined optimization criteria, wherein any of said expected cost calculations are based on any of said possible utilization scenarios and associated probabilities of said possible utilization scenarios occurring, and wherein said program instructions are stored on said computer readable medium.

* * * * *